March 10, 1970 H. S. POLIN 3,500,243
THERMODIELECTRIC OSCILLATOR
Filed April 26, 1968
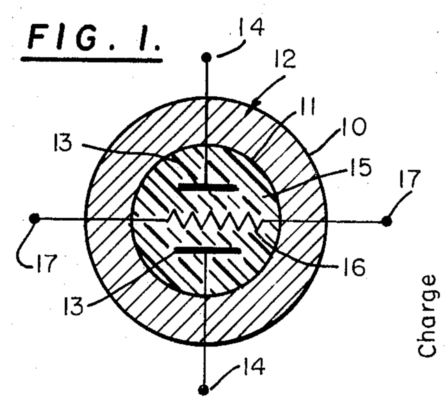
FIG. 1.
FIG. 2.
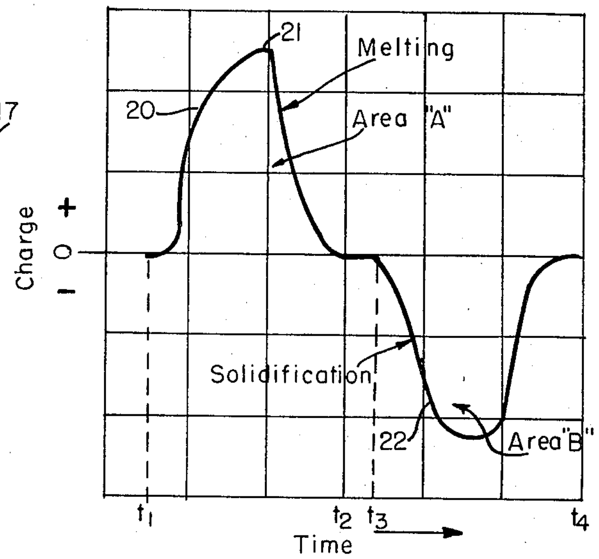
FIG. 3.
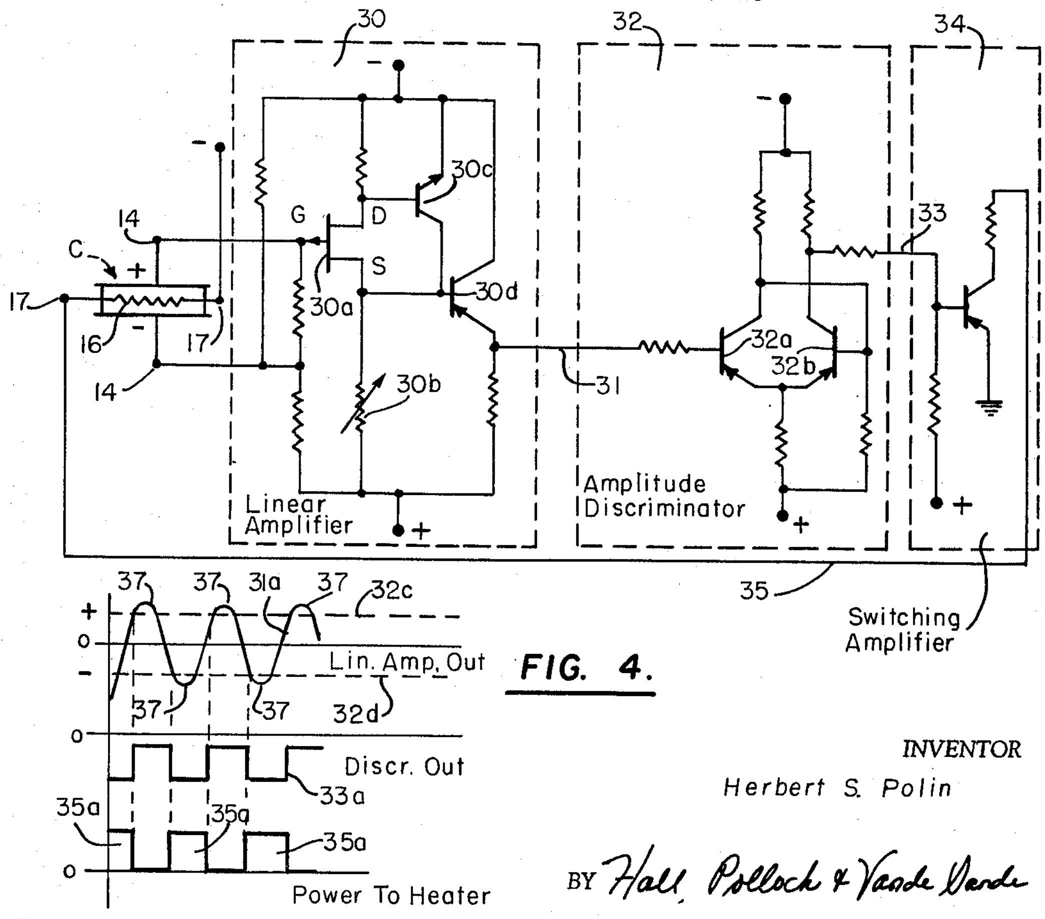
FIG. 3, FIG. 4
INVENTOR
Herbert S. Polin
BY Hall, Pollock & Vande Sande
ATTORNEY

United States Patent Office 3,500,243
Patented Mar. 10, 1970

3,500,243
THERMODIELECTRIC OSCILLATOR
Herbert S. Polin, 1255 Veyrier, Geneva, Switzerland
Filed Apr. 26, 1968, Ser. No. 724,464
Int. Cl. H03b 5/12, 19/14
U.S. Cl. 331—107 9 Claims

ABSTRACT OF THE DISCLOSURE

An oscillator is provided operative to produce a precise, relatively low frequency signal. The oscillator comprises a cell containing a solid dielectric material associated with a controllable heat source adapted to cycle the dielectric material between a solid state and a liquid or intermediate state. The changes in the physical state of the dielectric produce a varying electric charge across the cell, and the charge modification is coupled to an electronic circuit operative to control the cell heat source.

BACKGROUND OF THE INVENTION

Various arrangements have been suggested in the past for producing an oscillator capable of achieving a precise, relatively high frequency. In many applications, however, there is real need for a precise relatively low frequency, e.g., below 1,000 cycles per second; and when such a low frequency is needed, it has been customary in the past to construct a relatively high frequency oscillator circuit and then to divide the output of that circuit through the use of appropriate counters or the like. Such arrangements are necessarily costly, and complex; and the very complexity of the system, and the need for multiple dividing stages, necessarily tends to detract from the accuracy of the ultimate frequency produced unless extreme care is taken in the design of the overall system.

It is a principal object of the present invention to provide a relatively low frequency standard of high stability and small physical dimensions applicable for use, for example, as the reference frequency for an electronic watch or clock, e.g., of the type described in my prior U.S. Patents Nos. 3,194,003 and 3,195,016. In such an environment, and in other electronic environments which will be apparent to those skilled in the art, there is a real need for a frequency standard capable of producing a pre-determined desired, precise, relatively low frequency, and capable of achieving such a low frequency output with extremely low current drain and long-term unvarying persistence. The present invention accomplishes these purposes.

SUMMARY OF THE INVENTION

In providing a standard low frequency oscillator of the type described above, the present invention makes use of the electric charge developed and suppressed in the plates of a pseudo-capacitor as the solid dielectric of such a capacitor passes through a change of state, for example from a solid to a liquid state and back to a solid state. This phenomenon, sometimes termed the "thermo-dielectric effect" was first described in Paris in 1944 (J. Costa Ribeiro, three lectures at the Sorbonne, Le Revue Scientifique, 86, No. 3, G. Wlerick), and is further described in a paper by Gross and Dennard, "On Permanent Charges in Solid Dielectrics," Phys. Review, 67, 254, 1945. More particularly, the thermo-dielectric effect is characterized by the fact that if a solid dielectric pseudo capacitor is heated and cooled, the total available charge in the pseudo capacitor is a constant, the charge produced across the capacitor carries one sign during the melting phase and the opposite sign during the solidifying phase, and the net charge across the capacitor is zero at the end of any given cycle of heating and cooling.

To make use of the foregoing phenomenon in the present invention, a pseudo capacitor is provided comprising a miniature Dewar of enclosed configuration provided with collector electrodes. The outer envelope of the Dewar capsule is evacuated, and the inner envelope contains a dielectric material, a pair of spaced plates, and appropriate heater means such as a resistance wire, provided as a separate element or incorporated into one of the capacitor plates. The dielectric employed is selected to normally exhibit a solid state at room temperature, but is capable of being at least partially melted when power is supplied to the heater means within the Dewar capsule.

The capacitor plates are coupled to a solid state linear amplifier serving as an electrometer operative to measure the changing rate and level of the charge across the thermo-dielectric cell. More particularly, the electrometer measures the changing capacity of the pseudo-capacitor and delivers this signal to an amplitude discriminator, where the amplified output of the electrometer is clipped to provide switching signals for a switching amplifier. The switching amplifier in turn controls the current supplied to the heater of the thermo-dielectric cell, so as to provide regularly spaced pulses of current operative to subject the dielectric of the cell to regularly spaced heating cycles interspersed by regularly spaced cooling intervals.

The overall system thus operates to produce a precise, relatively low frequency, e.g., below 1,000 cycles per second. The frequency produced can be finely controlled by setting a bias potential in the electrometer portion of the circuit, and can be grossly varied or pre-determined by appropriate choice of the geometry of the capacitor plates employed, the size of the Dewar capsule, and/or the particular dielectric material and its volume employed in the capsule.

BRIEF DESCRIPTION OF THE DRAWING

FIGURE 1 is a cross-sectional diagrammatic view of a thermodielectric pseudo capacitor constructed in accordance with the present invention;

FIGURE 2 is a curve representing the operation of the structure shown in FIGURE 1;

FIGURE 3 is a schematic diagram of an oscillator constructed in accordance with the present invention employing a cell of the type shown in FIGURE 1; and FIGURE 4 is a set of wave form diagrams illustrating the operation of the circuit shown in FIGURE 3.

DESCRIPTION OF THE PREFERRED EMBODIMENTS

As discussed earlier, the low frequency reference oscillator of the present invention utilizes a thermodielectric cell which may take the form shown in FIGURE 1. More particularly, the cell comprises a Dewar capsule comprising a pair of envelopes 10 and 11 held in spaced relation to one another and enclosing an evacuated region 12 therebetween. The sole role of the Dewar container is to limit the influence of an environment of shifting temperature. A pair of capacitor plates 13 are disposed within inner envelope 11, and are connected by appropriate leads passing through the envelopes 10 and 11 to a first pair of terminals 14. The inner envelope 11 is, moreover, filled with a solid dielectric material 15; and said inner envelope contains a heater comprising, for example, a platinum resistance wire 16 connected by appropriate leads to a further pair of external terminals 17.

The theory of the shifting charge which resides in the lattice inhomogeneities of a dielectric such as 15, when said dielectric undergoes a change in state, is, in terms of the thermo-electric effect, substantially as follows. In a capacitor, the dielectric of which is partially in the solid state and partially in the liquid state, with one plate of the capacitor contacting the liquid phase and the other plate of the capacitor contacting the solid phase, an electric charge will accumulate, the magnitude and polarity of which will vary in consequence of the change of state of the dielectric responsive to the heating or cooling which induces such a dielectric change of state. If such a capacitor is connected as a part of an electrical circuit, the direction of the current produced in the circuit is related to the direction of the phase change, and the magnitude of the current produced is related to the rate of the phase change. A law of proportionality holds between the value of the evolved current and the rate of phase change. The total electric charge of the capacitor cell (capacitor plates and dielectric) is proportional to the mass of the dielectric which passes from one physical state to the other, the proportionality factor being characteristic for each class of dielectric. It is postulated that every dielectric substance can be identified by its characteristic thermodielectric porportionality diagram.

It must be emphasized that, while the preceding discussion has referred to a change of state of the dielectric from a solid to a liquid and back to a solid, that discussion is given by way of example only, and any change of state in a dielectric substance is accompanied by the evolution of an electric charge. Thus, the sublimination of a solid, and its subsequent condensation, will also produce the evolution of a thermo-dielectric charge and current. The change of state of water, for example, to snow and to ice and back to liquid, is accompanied by the evolution of an electrical charge curve of the type described.

In one form of the invention, the dielectric 15 may comprise the solid hydrocarbon, naphthalene ($C_{10}H_8$), as the dielectric substance of the cell. Pure naphthalene melts at 80° C. and does not undergo any irreversible physical or chemical change with multiple cycling between its melting temperature and its temperature of solidification. To fabricate a cell of the type described, melted napthalene is poured into a small glass cell in the shape of a Dewar, preferably having the capacitor plates 13 and heater 16 in place, the outer envelope of the cell having been evacuated and closed. After the naphthalene solidifies, it may be subjected to heat by causing an appropriate current to flow through resistance wire heater 16 via terminals 17. As the naphthalene melts, a charge will be produced across plate 13, and at terminals 14. When the naphthalene has been fully melted, or at any desired point during the melting cycle, current may be removed from heater 16 so as to permit the naphthalene to cool and to commence solidification. As it cools, the charge level at the capacitor diminishes and passes through zero. During the solidification phase, a charge of opposite polarity will be produced across terminals 14.

The foregoing operation of the cell shown in FIGURE 1 is depicted in FIGURE 2. If we assume that the dielectric 15 is in a solid state, and if we further assume that current is passed through heater 16 at a time commencing at $t_1$, the naphthalene will start to melt, causing charge conductors within the naphthalene to surface and to charge the capacitor plates 13—13. As the melting continues, the magnitude of the charge will increase at a rate and in a direction designated by curve 20 until a maximum charge 21 is achieved, after which time, as the melting continues, the magnitude of the charge will fall off. At time $t_2$, it is assumed that the naphthalene has been completely melted, and that the dielectric is now completely in its liquid phase, resulting in zero charge on the plates 13—13.

If current should now be removed from the heater, at an assumed time $t_3$, the naphthalene will start to cool and solidify. A further charge will thereupon be developed across plates 13—13 changing in the manner depicted by curve 22, and of a polarity opposite to that achieved during the melting phase. The magnitude and rate of change of charge during the solidification phase will vary in accordance with curve 22 until a time $t_4$ at which time the naphthalene is assumed to be completely resolidified.

The rising component of charge during the melting phase of the cycle is substantially matched by the rising component of charge, in opposite sense, during the solidification phase; and at the end of a complete cycle the charge across the cell is zero. Although the shapes of the melting and solidification envelopes shown in FIGURE 2 differ from one another, the area under the envelope of the melting phase (designated "area A") exactly replicates the area under the envelope of the solidification phase (designated "area B"), showing the complete reversibility of the effect.

It will be understood, of course, that complete melting and complete solidification, such as has been depicted in FIGURE 2, is not necessary. Melting, once commenced, may be terminated at any desired or appropriate point in the melting cycle, followed by a partial solidification followed in turn by partial melting, etc., so that the dielectric 15 is always in a partially melted state but is undergoing changes toward the completely melted or completely solidified state due to the application or removal of current to the heater 16. By such operation, an alternating charge will be produced across the cell, and the frequency of charge reversal will depend, at least in part, upon the cycle of applying and removing heating current to heater 16 via terminals 17.

While reference has been made to the use of naphthalene as the dielectric material in the cell, other dielectric materials having thermal and other physical constants differing from naphthalene may be used. When the cell is used to control an oscillator circuit, e.g., of the type to be described in reference to FIGURE 3, the actual time base of the oscillatory periodicity may be controlled in part by appropriate choice of the dielectric material. Some other such materials which can be used include solid paraffin (melting point, 50° C.) or other crystalline hydrocarbons, waxes such as carnauba, ouricuri, and montan, and other synthetic or natural organic or inorganic dielectric substances which are preferably solid at ambient temperatures.

The actual size of the cell shown in FIGURE 1 has been very much enlarged for purposes of clarity. When a cell of the type shown in FIGURE 1 is to be used as part of a frequency standard for an electronic watch, the volume of the cell is actually less than 5 $mm.^3$. A cell of these very small dimensions may be associated with appropriate solid state circuits such as field effect transistors, switching transistors, etc.; and, in the electronic watch application mentioned, the circuit itself may take the form of an integrated circuit incorporated into the logic and counter circuits of the watch, whereby the overall oscillator is of extremely small size.

The heating element of the cell, FIG. 1, should, preferably, be electrically insulated from the dielectric. When the heating element 16 comprises a platinum wire, for example, it should preferably be enclosed within a glass or quartz sheath, and/or it may be incorporated into one of the capacitor plates. The unit will operate without such protection, but local effects, (both thermal and electrical) at the dielectric-heater interface, may perturb the behavior of the cell.

When it is desired to vary the actual shapes, or some other properties, of the melting and solidification curves shown in FIGURE 2, it is possible to employ doping substances, in effect increasing the volume of charge carriers available in the system. However, care must be exercised in the selection of such doping substances since they represent impurities which may, in chemical combination with the dielectric, have a deleterious effect upon the long-term life of the encapsulated cell by forming compounds which may not respond completely reversibly to the alternate thermal cycling.

A cell constructed and operating in the manner generally described above in reference to FIGURES 1 and 2 can be associated with appropriate circuits operative to control application of power to the cell heater, thereby in turn to control the output of the cell. Various circuits can be employed depending upon the precise purpose to which the overall system is being put. When it is desired to employ the cell of FIGURE 1 as a portion of a low frequency, reference oscillator one possible circuit takes the form shown in FIGURE 3.

Terminals 14 of the cell may be coupled to the input of a solid state linear amplifier 30. These connections should be so made that the induced charge in the cell has the polarity indicated in FIGURE 3 when the dielectric of the cell is changing phase from solid to liquid. The electronic circuit actually shown in FIGURE 3, associated with the thermodielectric cell C, is straightforward and essentially conventional, and may take various forms known to those skilled in the art. A field effect transistor 30*a*, by virtue of its high impedance, serves ideally as an electrometer, to measure the level and rate of charge as it rises and falls and reverses its sign, at the output 14—14 of the cell.

While all circuit elements appear in the block diagram of FIGURE 3, the component parameter values are dependent upon the cell constants and upon the types of transistors selected and the frequency it is desired to achieve. The electronic circuit is divided into three functional sections, labeled in FIG. 3 as, (a) a linear amplifier, operating upon the output of the field effect transistor, 30*d*. The output of this amplifier is delivered to, (b) an amplitude discriminator 32 which clips the signal to a preferred reference voltage that takes into account the thermal constants of the cell and contends with the thermal time-lag which must be precisely reproduced during each cycle. At the preselected reference voltage. corresponding to the square wave 33*a* illustrated in FIG. 4, the signal is delivered to (c) a switching amplifier 34 which delivers power to the heating element, 16, or cuts off power, depending upon the value of the signal originating at the cell C and read by field effect transistor, 30*a*. In the particular arrangement shown in FIGURE 3, field effect transistor 30*a* is preferably coupled to a potentiometer 30*b* the setting of which may be varied as desired to control the cyclic periodicity of the oscillator. The signal produced as the cell dielectric is alternately heated and cooled is amplified by transistors 30*c* and 30*d* to produce an oscillating output on line 31 taking the form shown by curve 31*a* in FIGURE 4. The oscillating signal on line 31 is coupled to an amplitude discriminator 32 of known configuration comprising a pair of transistors 32*a* and 32*b* connected as shown in FIGURE 3. Discriminator 32 is constructed to exhibit an upper trip point and a lower trip point designated 32*c* and 32*d* respectively in FIGURE 4; and the various parameters and source values are so chosen that the cyclic output of linear amplifier 30 on line 31 causes discriminator 32 to pass periodically through its upper and lower trip points. In one embodiment of the invention upon which all experiments have been conducted, the upper and lower trip points occur at substantially +1 volt and −1 volt respectively.

The signal on line 31, passing through the upper and lower trip points of amplitude discriminator 32, causes the discriminator to produce a substantially square wave form output of the type designated 33*a* in FIGURE 4; and this output is supplied via line 33 to the input of the switching amplifier 34. The output of switching amplifier 34, appearing on line 35 is fed back to the cell as spaced pulses of current 35*a* applied to heater 16 of the cell, thereby causing the dielectric of the cell to be periodically subjected to pulses of heating current interspersed by cooling intervals. Thus, the completely reversible thermodielectric properties of the cell serve as an absolute control of each cycle which is reversed by the associated electrometer and electronic circuit. The overall arrangement thus accurately controls the moment of initiation and duration of each heating cycle, and makes appropriate allowance for thermal inertia (represented by curve segments 37 in FIGURE 4) as the cell passes from a heating phase to a cooling phase and vice versa.

While I have thus described a preferred embodiment of the present invention, many variations will be suggested to those skilled in the art, and certain of these variations have in fact already been described. It must therefore be understood that the foregoing description is intended to be illustrative only and not limitative of my invention, and all such variations and modifications as are in accord with the principles described are meant to fall within the scope of the appended claims.

Having thus described my invention, I claim:

1. In combination, a capacitor comprising a pair of spaced electrodes having a normally solid dielectric therebetween, heating means for raising the temperature of said dielectric to effect at least partial melting of said dielectric whereby an electric charge is produced across said electrodes during the transition of said dielectric between its solid and melted states, and utilization means coupled to said electrodes and responsive to the occurrence of said electric charge.

2. The combination of claim 1 wherein said pair of electrodes and said dielectric are enclosed within an envelope, said heating means comprising a resistance heater in said envelope, and a current source coupled to said resistance heater.

3. The combination of claim 2 including a further envelope surrounding and spaced from said first-mentioned envelope, the region between said spaced envelopes being evacuated.

4. The combination of claim 2 wherein said current source comprises means supplying spaced pulses of current to said heater, whereby said dielectric is heated toward its melting point during the occurrence of each of said pulses and cools toward its solidification temperature during the time intervals between said spaced pulses.

5. The combination of claim 4 wherein a charge of first polarity is produced across said electrodes as said dielectric is heated toward its melting temperature and a charge of second polarity, opposite to said first polarity, is produced across said dielectric as it cools toward it solidification temperature, said utilization means comprising means responsive to the occurrence of charges of one only of said first and second polarities.

6. The combination of claim 2 wherein said utilization means comprises electrometer means for producing a signal responsive to the magnitude and rate of change of the electric charge across said electrodes.

7. The combination of claim 6 including control means coupled to said electrometer means and responsive to said electrometer signal for controlling the output of said current source.

8. The combination of claim 7 wherein the signal produced by said electrometer means is an oscillating signal, said control means including switching means responsive to said oscillating signal for providing spaced pulses of current from said current source to said heater, and means for controlling the oscillatory rate of said electrometer signal thereby to vary the repetition rate of said spaced pulses of current.

9. The combination of claim 1 wherein said dielectric comprises naphthalene.

No references cited.

JOHN KOMINSKI, Primary Examiner

U.S. Cl. X.R.

317—247; 331—66, 143